…

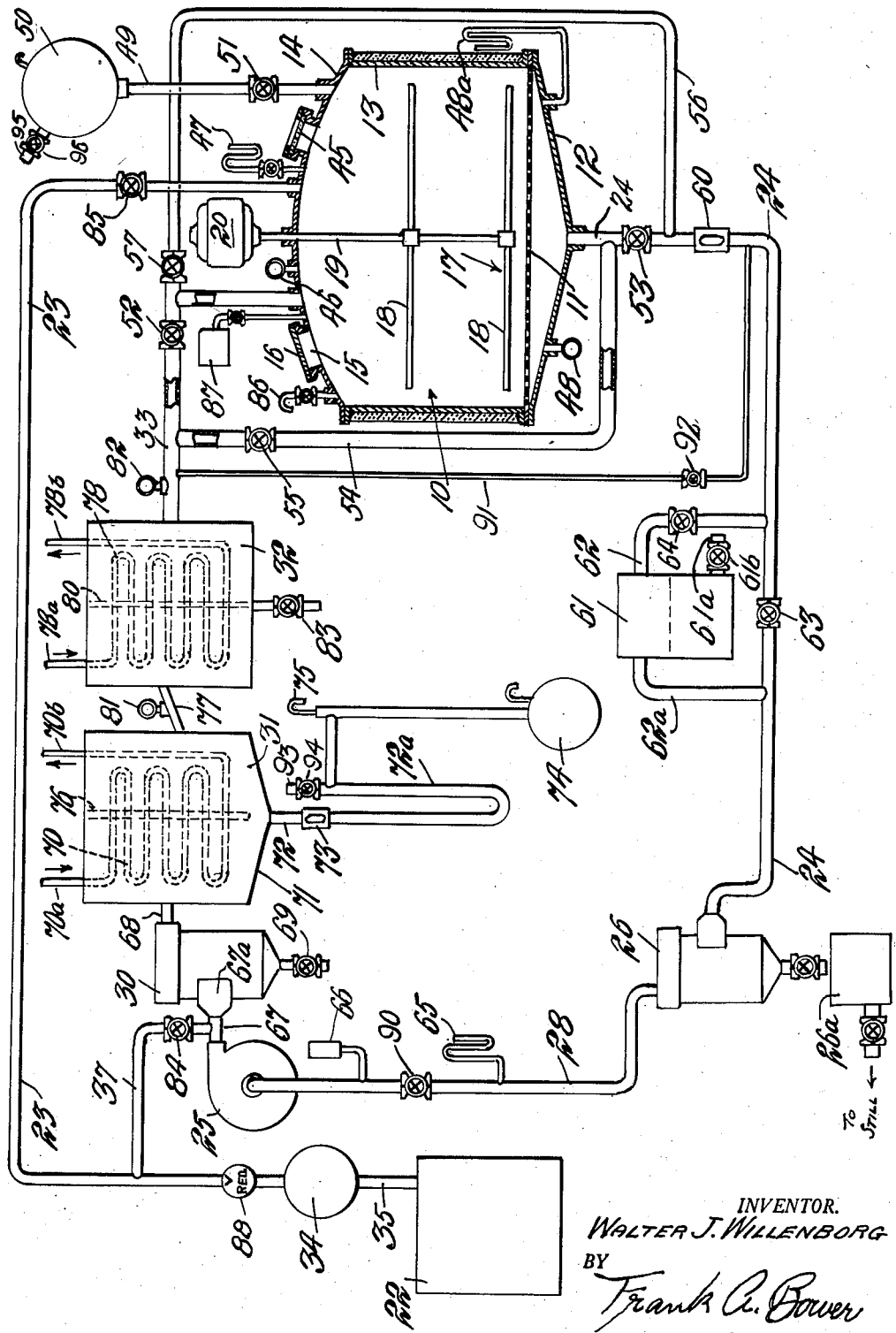

United States Patent Office 2,824,646
Patented Feb. 25, 1958

2,824,646

RECIRCULATION DRIER

Walter J. Willenborg, Weehawken, N. J., assignor of one-fourth to J. Lawrence Robinson, Summit, and one-fourth to Joseph L. Kopf, Maplewood, N. J., and one-fourth to John Frank Biehl, Beechhurst, N. Y.

Application April 13, 1955, Serial No. 501,137

9 Claims. (Cl. 210—68)

This invention relates to apparatus and processes for drying decomposable material and particularly for the drying of sodium hydrosulfite.

In the final stages of the production of a dry powdered sodium hydrosulfite a slurry is formed comprising a suspension of insoluble granular sodium hydrosulfite in crystalline form in a water liquor. The dry sodium hydrosulfite is produced by draining the water liquor from the slurry, washing the sodium hydrosulfite with alcohol to remove the remaining water liquor and drying the washed sodium hydrosulfite by evaporation of the residual water from the powdered crystalline hydrosulfite. The damp sodium hydrosulfite when in contact with air tends to decompose into sulfur dioxide and other compounds. This reaction is exothermic and under proper conditions will produce an explosion damaging the processing equipment, storage bins or transporting containers.

An object of the invention is drying a decomposable material in an inert atmosphere.

Another object of the invention is to provide apparatus for separating a solid suspended in a liquid by removing the liquid from the solid and drying the solid.

A further object of the invention is to provide a process for producing sodium hydrosulfite having a purity higher than now obtainable by present drying means.

A still further object of the invention is to reduce the time and cost of drying of sodium hydrosulfite and to increase the purity.

Other and further objects and advantages of the present invention will be apparent from the following specification taken in connection with the accompanying drawings.

In this invention the sodium hydrosulfite slurry is received from the preceding processing equipment and poured into the drying tank 10 of the recirculation drier and onto the flat small size mesh screen 11 supporting the slurry above the conical bottom 12. The recirculation drier is filled with an inert atmosphere derived from the inert gas supplied by the inert gas producer 22. The inert atmosphere preferably has less than six percent oxygen and includes after passing through the tank the extracted vapors and gases. The inert atmosphere or gas isolates the slurry from the oxygen of the air. The water liquor and granular sodium hydrosulfite are separated by draining the liquor through the screen by the weight of the liquor and the pressure of the inert atmosphere. The sodium hydrosulfite remains as a porous granular layer of crystals which is washed by alcohol to remove the remaining water liquor and impurities and dried by a heated inert atmosphere. The slurry may be stirred by an agitator 17 to facilitate the washing and drying of the sodium hydrosulfite.

The tank 10 has a cylindrical side wall 13 with a cover head 14 fitted on top of the wall. The cover head has a manhole 15 through which the slurry is introduced into the tank and out of which the dried crystals are removed. The bottom, wall and cover head are sealed to exclude air from within the tank and to contain the inert atmosphere for drying the crystals. The removable manhole cover 16 closes the manhole 15.

The cover head has two glass ports, one port for illumination at the interior and the other for observation. One of the ports is illustrated at 45. The temperature and pressure of the gas or inert atmosphere before passing through the crystals is measured by the thermometer 46 and the water manometer 47 mounted on cover of the tank. The temperature of the gas with the vapors after passing through the crystals is measured by the thermometer 48 and the mercury manometer 48a mounted on the bottom 12. The circulating atmosphere is introduced into the tank by the pipe 33 which is connected to the cover 14. The alcohol is fed by the pipe 49 to the tank 10 through the cover 14 from a storage tank 50. A valve 51 is provided in the pipe 49 adjacent to the cover 14 to control the flow of alcohol to the tank. The inert gas is introduced into the closed circulation system by the pipe 23 connected to the cover 14 and having a valve 85. At the bottom of the tank the drain pipe 24 is connected to the apex of the conical bottom 12 to drain the excessive water from the slurry and the alcohol washing through the sodium hydrosulfite. A valve 53 is provided to close the drainage of the fluids from the tank. The flow of hot gas may be reversed through the crystals by the pipe 54 with valve 55 and the pipe 56 with valve 57. The pipe 54 connects the pipe 33 to the pipe 24 between the valve 53 and the bottom 12 and the pipe 56 connects pipe 24 on the other side of valve 53 to pipe 33 between valve 52 and the cover head 14. Thus with valves 52 and 53 closed and valves 55 and 57 open the flow of hot gas from pipe 33 will pass through valve 55 to pipe 24 then into the bottom of the tank 10 and up through the crystals into the top of the tank 10 and out through pipe 56 back to the pipe 24. The gauges 48 and 48a then become input gauges and gauges 46 and 47 become output gauges.

A sight glass 60 is provided in the drain pipe 24 to observe the flow of effluent from the tank 10 and determine when the water and subsequently the washing alcohol have completely drained from the tank 10.

The water from the slurry is diverted into the water disposal tank 61 by the pipe 62 and the valve 63 in the pipe 24. The pipe 62a is a shunt around the valve 63 and passes the inert gases back into the pipe 24. The pipe 62 has a valve 64 which is opened on closing of valve 63 to pass the water from tank 10 and closed when the water has been completely drained from tank 10 as observed through sight glass 60. The pipe 62 extends into the tank 61 above the level of the disposed water so that the gases that may be in or flowing with the water are separated out and pass out through the pipe 62a. The tank 61 has a drain 61a with a valve 61b at the bottom to dispose of the water as waste between each batch. The tank 61 is preferably below the level of the bottom of the tank 10 so that the water will drain by gravity from the tank 10 into tank 61.

The separator 26 is connected to the tank 10 by the pipe 24 through the valve 63. The separator recovers the liquid alcohol used in washing the sodium hydrosulfite. The pipe 24 terminates at the separator and drops the alcohol into the tank 26a. The alcohol in the vapor or gaseous form passes through the separator with the gas and is subsequently recovered in the condenser 31. The mixture of inert gas and alcohol vapors are drawn out of the separator by the suction of the blower 25 through the pipe 28. A mercury manometer 65 and a pitot tube 66 are attached to the pipe 28 to measure the pressure and flow of the gas and vapors.

The blower 25 is of the centrifugal type with the input connected to pipe 28 and the output to pipe 67 and drives the inert atmosphere at a predetermined rate through the recirculation system. The output pipe 67 is connected to the cyclone separator 30 where solid foreign matter is separated from the gas, and the clean gas exhausted at 68. The foreign matter is disposed of at 69. The clean gas and alcohol vapors are delivered to the condenser 31.

The condenser 31 has cooling pipes 70 passing cold water or a brine solution at well below the condensation temperature of alcohol and water vapor. The alcohol and water are condensed and collect on the conical bottom 71 of the condenser. The condensate drains off through the drain pipe 72. The flow is observed through the sight glass 73. The alcohol passes through the trap 72a into the alcohol collector tank 74. A vent 75 is provided as a vent to prevent the establishment of a syphon drawing the liquid out of the trap. The condenser 31 is positioned above the tank 74 to drain the condensate by gravity. The condenser has baffles 76 to deflect the flow of gases over the cooling pipes and lengthen the flow path of the gases through the condenser. The dry cool clean gases exhaust into the heater 32 through the pipe 77. The heater 32 has heating coils 78 passing steam to raise the temperature of the chilled gas from the condenser to a heated gas for drying the crystals. The steam is delivered from the pipe 78a to the coils 78 and removed by exhaust pipe 78b. Baffles 80 are positioned to form a long flow path for the gases. The heated gases are delivered at the desired temperature to the pipe 33. A thermometer 82 is connected to the pipe 33 at the output of the heater to measure the temperature of the heated gases and the thermomenter 81 is connected to the pipe 77 to measure the input temperature.

In considering the process of drying a batch of sodium hydro-sulfite by the apparatus hereinbefore described the apparatus will be assumed to be initially filled with air requiring the circulation of the inert gas through the recirculating system and venting the air through vent 86 on the cover head until the atmosphere within the system is reduced to an acceptable air to inert gas ratio. The charging of the recirculation drying apparatus is accomplished by first opening valves 52, 53, 55, 57, 64 and then opening valves 84 and 85 to the inert gas producer and the vent valve 86 to the atmosphere. The inert gas producer has been operating and storing a supply of inert gas in the high pressure tank 34 the pressure of the inert gas discharged into the system is controlled by the reducing valve 88 in pipe 23. The reducing valve limits the gas pressure in pipes 23 and 37 preferably to a pressure equal to the operating pressure of the recirculation system. The inert gas flows through the pipes 23 and 37 into the tank 10 and pipe 67 and the separator 30, condenser 31, and heater 32. The gas is thus fed into the system. The blower 25 is intermittently operated to circulate the inert gas and air mix the air and gas together. The ratio of inert gas to air is measured by the orsat 87 connected to the tank 10, when the oxygen content is reduced to an acceptable amount the valves 55, 57 and 86 are closed. The valve 84 remains open to continuously add inert gas to the atmosphere of the recirculation system when the gas drops below the prescribed pressure. The valve 85 is closed and opened when the cover 16 is removed. The trap in the condenser drain pipe 72 is filled with water and the valves 70a and 70b are opened to circulate the cooling water through the pipes 70. The valves 78a, 78b are opened to pass the steam through the heating coils 78. The slurry is then poured into tank 10 by opening manhole 15. The cover 16 is replaced and secured. The valve 63 is closed and valve 64 is open. During the loading operation the valve 53 is closed and the valve 85 in the inert gas delivery pipe is opened to flood the tank with inert gas at above atmospheric pressure so that there is an exhausting of gas through the open manhole. The exhausting is produced by the displacement by the slurry and the pressure of the inert gas. The water from the slurry drains through the screen 11 and down the drain 24 to the water disposal tank 61 where the water is temporarily collected. The pipes 62 and 62a terminate above level of the water in the tank. The suction of the blower 25 extends through the pipe 62a to the tank 61 and through pipe 24 to the space underneath the screen 11 thereby creating a pressure differential across the water in the slurry which with the weight of the water and the positive gas pressure forces the water from the slurry. The water drains off and the flow is observed through the sight glass 60. When all the water has drained the valve 64 is closed and the valve 63 is opened, the blower 25 is stopped and the valve 53 is closed blocking the drain. The tank 10 is filled with alcohol to cover the top of the slurry. The agitator 17 is rotated by the motor 20 so that the blades 18 scrub the sodium hydrosulfite crystals. This step is performed for short periods. After the alcohol has mixed with water saturated crystals the valve 53 is opened and the blower is turned on. The agitator is stopped during the draining. The alcohol drains into the tank 26a from the separator 26. The washing step may be performed several times. After the last washing step and all the alcohol has drained the blower 25 and agitator 17 are operated forcing the heated gases through the crystals and completing the drying process. The vapor laden gas passes through the pipe 24 under the pressure differential created by the blower. Any suspended liquid alcohol is dropped from the gas at the separator 26. The inert gas is drawn into the blower 25 and discharged into the cyclone separator 30 where suspended foreign matter is removed. The blower forces the gas into the condenser 31 through the pipe 68. The baffles 76 divert the flow of the gases over the condenser coil 70 to have the longest path of travel and prevent any short circuiting of the gases through the condensers. The remaining alcohol and water are chilled and condensed on the coils 70 to form a condensate that drains through the bottom into the pipe 72. Since the pressure inside the recirculation system is above atmospheric pressure the trap 72a is provided to seal the condenser against air from the outside. The height of the condensate forces the water or alcohol in the trap over into the tank 74. The dry inert gas is forced into the heater 32 where baffles 80 similar to baffles 76 are provided to increase the path of flow thereby heating all of the gases to the proper temperature. The thermometers 81 and 82 measure the incoming temperature and the outgoing temperature of the gases. The steam passed through should have such heat and temperature to raise the temperature of the gas moving through the heater at the designated rate to a value to render the gas and capable of removing the moisture and alcohol. The gas pours through the pipe 33 into the tank 10. The dissipation of heat from the gas is reduced by lagging the pipes 33 and 54 with insulation and lagging the side wall 13 with insulation. The bottom 12 may be heated to increase or maintain the tank at a high temperature.

The sodium hydrosulfite is in a porous crystalline state and the gases are forced through it by the suction on the bottom and the pressure on the top. The agitator rotates and the blades tumble and shift the crystal particles so that all of the crystals are brought into contact with the circulating gases. Since evaporation occurs in the mass as long as there is alcohol or water present the temperature of the gases above the mass is higher than the temperature of the gases that have passed through and are below the mass. The latent heat of evaporation drops the temperature of the gases. When the differential between the readings of thermometer 46 and the thermometer 48 begins to diminish the sodium hydrosulfite crystals are dry and may be removed from the tank 10 without decomposing in contact with the air.

The blower 25 should have sufficient capacity to circulate the inert atmosphere at a rate to dry the crystals rapidly and develop a pressure to force the inert atmosphere through the crystals at the desired rate. The rate of flow of the blower is regulated or controlled by the gate valve 90 on the intake side of the blower in the pipe 28. Preferably the valve 90 is closed when the system is at atmospheric pressure. The valve is gradually opened as the tanks and separator are gradually evacuated and reduced in pressure. The filling of the tank 10 with the slurry blocks the flow of gas through the system. A bypass pipe 91 is connected between pipe 33 and pipe 24 below the valve 53. The pipe 91 is preferably considerably smaller than the other pipes. The flow of gas is controlled by the valve 92 in the pipe 91. The valve 92 is normally closed but on the introduction of the slurry to the tank 10 the bypass valve is opened to complete the flow path through the system and maintains the proper pressure in the tanks 61 and 26a and the separator 26. The pipes 24, 28 33, 67, 68, 77 and 54, 56 are of a sufficient size to maintain the velocity of the gas through the pipes below a maximum value. The condenser should have a cooling capacity to recover the vapors from the gas at the required rate of flow and the heater raises the temperature of the gas to a given temperature.

In the final step of the process the dry crystalline sodium hydro-sulfite is removed from the tank 10. The blower and agitator are stopped and the manhole cover 16 removed. A suitable suction means is inserted in through the manhole and the crystals 15 are sucked out of the tank passed through cyclones and deposited into a storage tank or barrels. The time of drying may be controlled by the rate the gas is circulated through the system. This rate may be controlled by the valve 90 or the speed of the blower 25.

The manometer 47 measures the positive pressure of the blower above the sodium hydro-sulfite and manometer 48a measures the negative pressure below. The blower 25 pulls the required number of cubic feet per minute through at a ten inch mercury reading.

The valves 69 and 83 on the cyclone separator 30 and heater 32 respectively are closed during the drying of a batch and are only opened to clean the separator and heater respectively. The foreign matter separated by the separator is removed therefrom through the opening 69. The valve 83 is opened to drain off any condensate collected in the heater when the apparatus is shut down. The trap 72a is filled with water through the inlet 93 with a valve 94 on one of the legs of the trap.

The drying of the crystals after the alcohol washing steps may be more easily accomplished by reversing the direction of flow through the crystals. The valves 52 and 53 are closed and valves 55 and 57 opened. The gas then flows from pipe 33, up from the bottom 12 through the crystals in the tank and out through the pipe 56 to the pipe 24.

The agitator is rotated similar to the forward flow drying. The differential between the readings on the thermometer will reverse since the entering higher temperature gas is at the bottom and the vapor laden gas is at the top. The alcohol in the tank 26a and tank 74 is delivered to a still (not shown) to recover the alcohol for re-use in washing the crystals. The alcohol recovered from the tank 26a and tank 74 is approximately ninety-nine percent of the alcohol used in the wash. This alcohol after being distilled is returned to the storage tank 50 through the pipe 95 and valve 96. This high recovery of the alcohol represents a substantial saving in the cost of drying the sodium hydro-sulfite. Various types of solvents may be used such as benzene, petrohol and the like.

The porous granular layer is damp with a residue of liquor and impurities. These are removed by the washing with liquid in which the granular material is insoluble. In the case of sodium hydro-sulfite benzene or an alcohol may be used and two washings have been found to be sufficient to remove the water liquor and the impurities such as sodium hydroxide formed in the preceding manufacturing process. The number of washes required can be determined by the contamination of the washing liquid at the end of each wash.

The impurities are further reduced by the isolation of the sodium hydro-sulfite in an inert atmosphere and the thorough drying of the crystals by the heated inert atmosphere forced through the layer. The water, alcohol and other impurities are vaporized by the heat of gas and stripped from the crystals by the draft and carried out of the layer into the bottom of the tank. This protection of the sodium hydro-sulfite by the inert atmosphere and the thorough removal of the moisture reduces the decomposition to a minimum and no further impurities are produced by decomposition. The sodium hydro-sulfite is thus limited to the impurities introduced with the original materials or produced in the manufacture of the slurry. Thus an increase in purity of four to five percent is now obtainable over present drying systems from similar batches of slurry.

A further advantage obtained is the prompt storing of the material and storage without subsequent explosion. The apparatus is a recirculation drier with the pressure of the gas forcing the water and alcohol through the sodium hydro-sulfite crystals.

In the foregoing specific embodiment of drying sodium hydro-sulfite the tank 10 has a capacity to hold forty two hundred pounds of slurry which on drying produces approximately fourteen hundred pounds of granular sodium hydro-sulfite. The blower 25 circulates the gas or inert atmosphere through the tank at a rate of 750 cubic feet per minute. The condenser 31 drops the temperature of the gas to approximately 7° C. The heater receives the gas at that temperature and the steam is circulated in the coils 78 to raise the temperature of the gas exhausted into pipe 33 to 96° C. at the rate of 750 cubic feet per minute. The pressure of the gas above the slurry is above atmospheric pressure and is in the order of four to ten inches of water. The suction on the gas below the slurry is in the order of four inches of mercury and is below atmospheric pressure. The capacity of the tanks 61 and 26a is approximately one thousand gallons and readily stores the liquid drained from the slurry. The collector tank 74 has a capacity of one hundred and fifty gallons.

Although the foregoing description of the invention has been of the apparatus and process for producing dry granular sodium-hydrosulfite crystals the apparatus and process may be applied to the production of any dry granular material from a suspension of the material in a slurry such as dyes, flaked zinc saturated with water, acids in crystalline form and other salts insoluble in the suspending liquid. The apparatus may also be utilized for the drying of any highly oxidizable powdered or granular material.

The permissible maximum percentage of oxygen in the inert atmosphere will vary with the particular material being dried. It is of course always desirable to have none or in negligible amounts.

Various modifications and changes may be made in the apparatus and process without departing from the scope of the invention as set forth in the appended claims.

I claim:
1. A closed recirculation drier for removing liquid from and drying material within a closed system comprising means for supplying inert gas, a drying tank having a screen for holding material in a liquid slurry and as a moist powder, a blower having an output delivering inert gases to one side of the screen in the tank and an input drawing gases from the other side of the screen in the tank, a heater between said blower output and said tank to heat the inert gases, collecting means within the closed system for receiving the liquid drained from the slurry under the pressure of the gases, a condenser to remove the vapor of the liquid from the inert gases and a heater to raise the temperature of said gases, said condenser and heater being connected between the blower and the tank to dry the inert gases forced through the material.

2. A closed recirculation drier as claimed in claim 1 wherein means are provided for supplying a cleaner in the liquid state to the tank to remove the liquid in the material, and separate means within the closed system are provided to collect the cleaner drained from the tank.

3. A closed recirculation drier as claimed in claim 2 wherein separate means are provided to collect the slurry liquid and the cleaner liquid.

4. A recirculation drier as claimed in claim 2 wherein an agitator is provided in said tank to stir the material.

5. A process for producing a dry powdered crystalline material in a sealed tank comprising depositing a water slurry in said tank, sealing said tank and filling said tank with an inert atmosphere, draining the water from said slurry under pressure of said atmosphere, immersing said drained slurry in an alcohol, draining said alcohol under pressure of said atmosphere and circulating dry heated inert gases through said crystalline material to remove the remaining water.

6. A process for producing a dry powdered crystalline sodium hydro-sulfite comprising depositing a water slurry with a suspension of granular sodium hydro-sulfite on a small size mesh screen in a sealed tank containing an inert atmosphere, compressing said atmosphere to apply a pressure on said slurry to force said water from the slurry by an inert atmosphere through the screen to form a moist layer of granular sodium hydro-sulfite, washing said layer with a water absorbing liquid to remove the water from said layer and removing said liquid and water from said layer by forcing hot inert atmosphere through said layer to volatilize the remaining liquid and water and dry the layer of granular crystalline sodium hydro-sulfite.

7. A recirculation drier for removing liquid from and drying granular material suspended in crystalline form in a water slurry and comprising a sealed drying tank having a bottom with an outlet and a small size mesh screen spaced from the bottom to support the granular material above the bottom, a blower having an output coupled to said tank on one side of said screen to force inert atmosphere through said screen and having an intake coupled to the other side of said screen to suck atmosphere from the other side of said screen, a condenser and heater connected between said outlet and said tank to remove the vapors from the atmosphere and to raise the temperature of the atmosphere to dry the material in the tank.

8. A recirculation drying system for obtaining a dry crystalline granular sodium hydro-sulfite from a water slurry comprising a tank having a small size mesh screen for supporting a suspension of granular sodium hydro-sulfite in a water slurry and a moist powder isolated from air by an inert atmosphere, a blower for circulating the inert atmosphere through the system and having an outlet and an intake, means for coupling said outlet to said tank on one side of said screen to force said inert atmosphere against said slurry, means for coupling said intake on the other side of said screen to produce a suction, a water collector connected to said intake coupling means to receive the water drained from the slurry by the pressure of the inert atmosphere, a means for providing a cleaning liquid coupled to said tank to deliver the cleaning liquid to the tank for scrubbing said layer clean of water and impurities, means in said intake coupling means for collecting said cleaning liquid, and means in said outlet coupling means for removing the vapors from and heating said inert atmosphere, said blower forcing said inert atmosphere through said layer of granular material to remove the remaining water and cleaning liquid.

9. A recirculation drying system for obtaining a dry crystalline granular material from a water slurry comprising a tank having a small size mesh screen for supporting a suspension of granular material in a water slurry and a moist powder isolated from air by an inert atmosphere, a blower for circulating the inert atmosphere through the system and having an outlet and an intake, means for coupling said outlet to said tank on one side of said screen to force said inert atmosphere against said slurry, means for coupling said intake on the other side of said screen to produce a suction, a water collector connected to said intake coupling means to receive the water drained from the slurry by the pressure of the inert atmosphere, means for providing cleaning liquid coupled to said tank to deliver said cleaning liquid to the tank for scrubbing said layer clean of water and impurities, means in said intake coupling means for collecting said cleaning liquid, and means in said outlet coupling means for removing vapors from and heating said inert atmosphere, said blower forcing said inert atmosphere through said layer of granular material to remove the remaining water and cleaning liquid.

References Cited in the file of this patent

UNITED STATES PATENTS

| Number | Name | Date |
|---|---|---|
| 761,042 | Gatham | May 24, 1904 |
| 1,059,820 | Besemfelder | Apr. 22, 1913 |
| 2,221,806 | Loomis | Nov. 19, 1940 |
| 2,301,803 | Davis | Nov. 10, 1942 |
| 2,316,195 | Troxler | Apr. 13, 1943 |
| 2,367,487 | Dessetti et al. | Jan. 16, 1945 |
| 2,497,572 | Ansel | Feb. 14, 1950 |

U. S. DEPARTMENT OF COMMERCE

PATENT OFFICE

CERTIFICATE OF CORRECTION

Patent No. 2,824,646            February 25, 1958

Walter J. Willenborg

It is hereby certified that error appears in the printed specification of the above numbered patent requiring correction and that the said Letters Patent should read as corrected below.

Column 2, line 66, for "are" read -- is --; column 3, line 46, for "34 the" read -- 34. The --; lines 57 and 58, for "10, when" read -- 10. When --; column 4, line 51, after "gas" insert -- dry --; column 5, line 25, after "tank" insert a comma; line 69, after "hydro-sulfite" insert a comma; column 6, line 22, for "forty" read -- forty- --.

Signed and sealed this 15th day of April 1958.

(SEAL)

Attest:

KARL H. AXLINE                          ROBERT C. WATSON

Attesting Officer                      Commissioner of Patents